United States Patent [19]

Oikawa et al.

[11] Patent Number: 5,337,186
[45] Date of Patent: Aug. 9, 1994

[54] TRANSMISSIVE IMAGE DISPLAY DEVICE

[75] Inventors: Masahiro Oikawa; Hiroyuki Nemoto; Kenjiro Hamanaka; Takashi Kishimoto, all of Ibaraki; Fumiaki Funada, Nara; Hiroshi Hamada, Nara; Takashi Shibatani, Nara, all of Japan

[73] Assignees: Nippon Sheet Glass, Inc.; Sharp Kabushiki Kaisha, both of Japan

[21] Appl. No.: 893,321

[22] Filed: Jun. 3, 1992

[30] Foreign Application Priority Data

Jun. 3, 1991 [JP] Japan ................................ 3-160004
Sep. 27, 1991 [JP] Japan ................................ 3-277022

[51] Int. Cl.$^5$ ............................................. G02B 27/00
[52] U.S. Cl. ...................................................... 359/628
[58] Field of Search .................... 359/619, 620, 628; 523/168

[56] References Cited

U.S. PATENT DOCUMENTS

| | | | |
|---|---|---|---|
| 2,312,329 | 3/1945 | Fleming | 523/168 |
| 3,315,035 | 4/1967 | Applegath et al. | 523/168 |
| 4,509,824 | 4/1985 | Yamasaki et al. | 359/619 |
| 4,807,978 | 2/1989 | Grinberg et al. | 359/619 |
| 5,035,486 | 7/1991 | Inokuchi | 359/619 |

FOREIGN PATENT DOCUMENTS 60-165621 8/1985 Japan .
60-165622 8/1985 Japan .
60-165623 8/1985 Japan .
60-165624 8/1985 Japan .

*Primary Examiner*—Edward K. Look
*Assistant Examiner*—F. Daniel Lopez
*Attorney, Agent, or Firm*—Merchant, Gould, Smith, Edell, Welter & Schmidt

[57] ABSTRACT

A projection-type image display device includes a transmissive image display panel having a matrix of pixels arranged at different pitches in different directions perpendicular to each other, and a planar microlens array for converging light emitted by a light source onto the transmissive image display panel. The planar microlens array comprises a substrate and a matrix of microlenses disposed on the substrate for converging the light onto the pixels, respectively, each of the microlenses being of an oblong shape. Each of the microlenses may have a longitudinal axis inclined with respect to an axis of the matrix of pixels to cover the pixel aperture of one of the pixels. The oblong shape of each of the microlenses may be composed of a pair of spaced identical semicircles and a rectangle interconnecting the identical semicircles and having sides of the same length as the diameter of the semicircles. Since the oblong microlenses are shaped to fully cover the pixel apertures of the corresponding pixels, the light from the light source is efficiently converged onto the pixels by the microlenses to produce light display images.

12 Claims, 8 Drawing Sheets

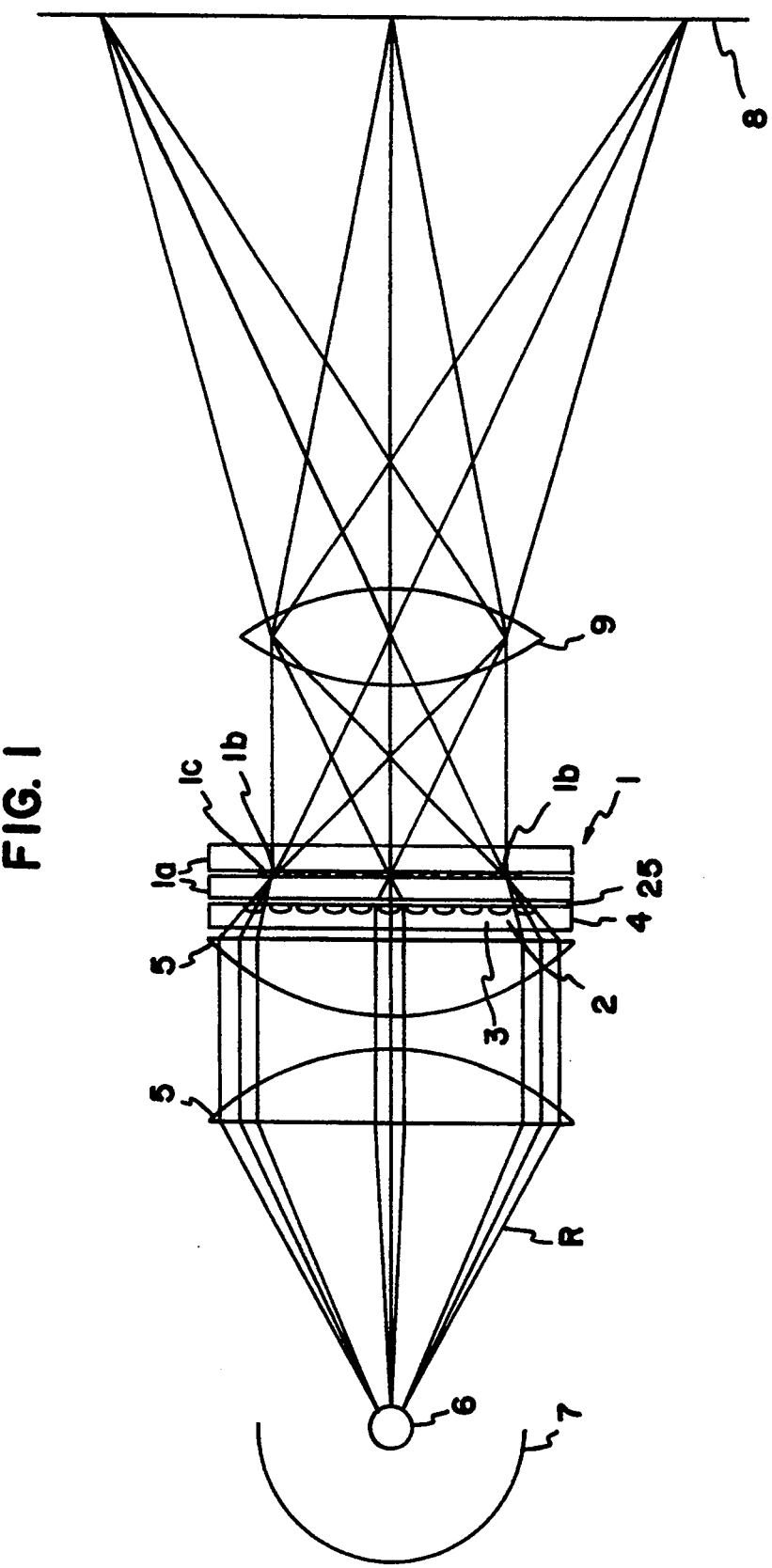
FIG. I

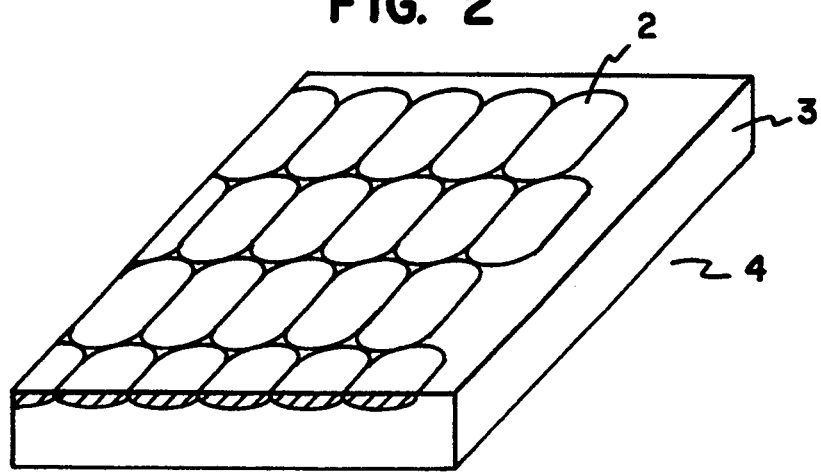
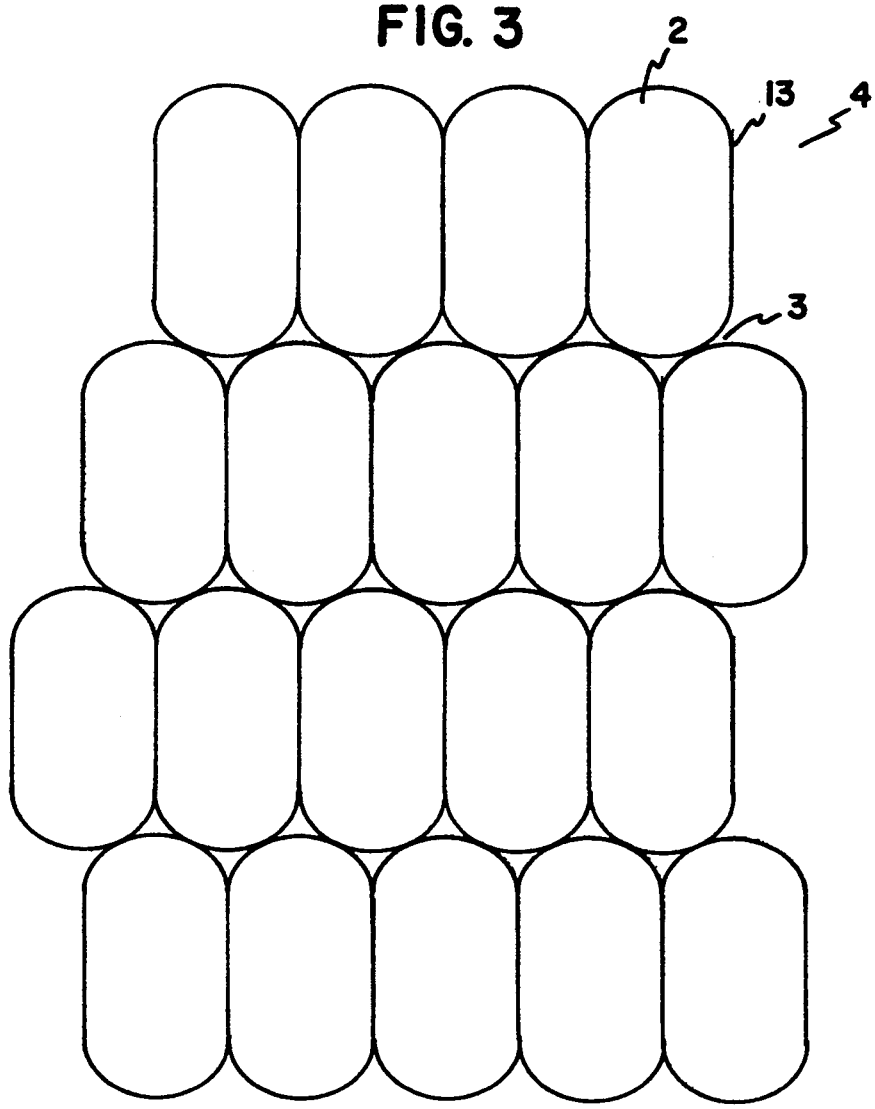

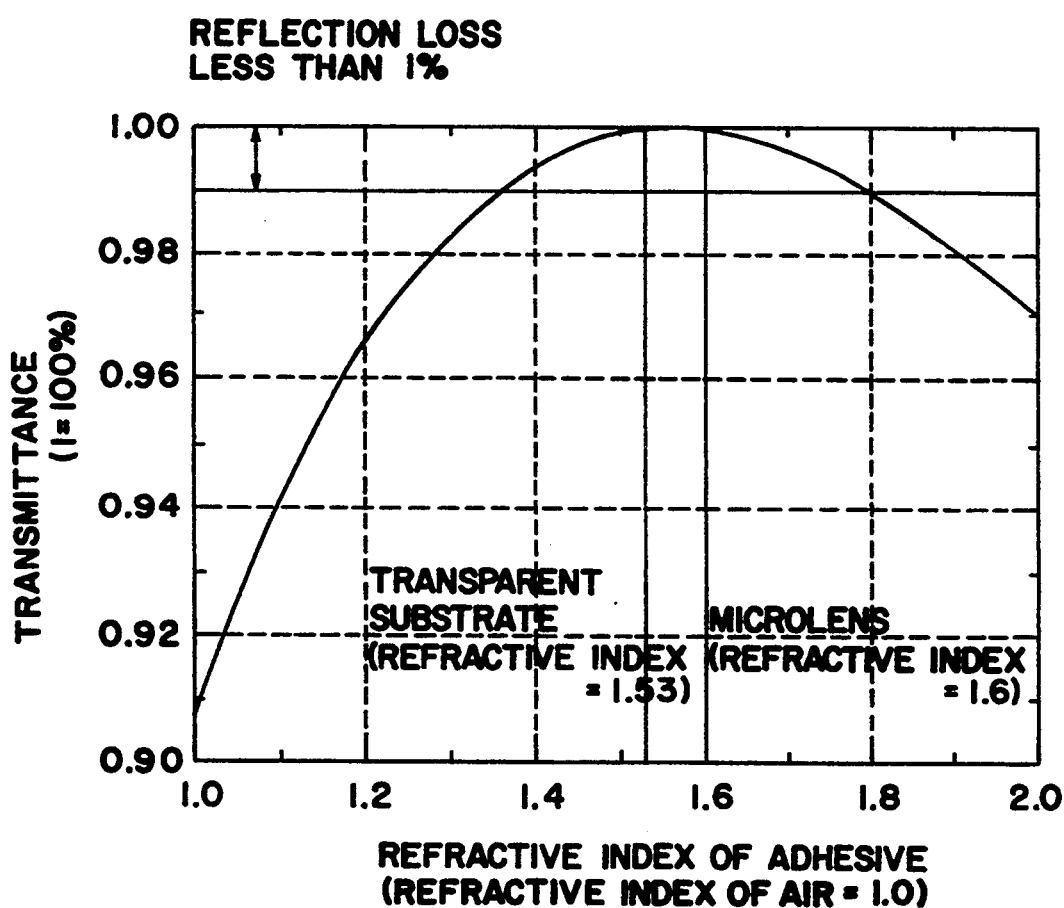

TRANSMISSIVE IMAGE DISPLAY DEVICE

BACKGROUND OF THE INVENTION

1. Field of the Invention

The present invention relates to a projection-type transmissive image display device having a liquid crystal display panel for producing a display pattern based on light applied to and transmitted through the liquid crystal panel, and more particularly to such a transmissive image display device which includes a planar microlens array for converging light onto each pixel of the liquid crystal panel.

2. Description of the Relevant Art

Some projection-type transmissive image display devices employ a liquid crystal display panel having a matrix of minimum display units known as pixels. The image display devices display desired images and/or characters when independent drive voltages are applied to the pixels to modify optical properties of the liquid crystal of the pixels. Since it is necessary for the pixels to have wires which apply the drive voltages, each of the pixels has a relatively small aperture through which the light passes.

If it is assumed that light applied to liquid crystal display panels has the same intensity, then those crystal display panels which have smaller pixel apertures produce darker images on the screen because the light that is applied to the pixel areas other than the apertures Goes not pass through the apertures.

To solve the above problem, there have been proposed planar microlens arrays comprising circular planar microlenses which are rotationally symmetric with respect to their optical axes and disposed in Confronting relationship to the respective pixels, for converging the applied light onto the pixels (see, for example, Japanese laid-open patent publications Nos. 60-165621, 60-165622, 60-165623, and 60-165624).

As shown in FIG. 9 of the accompanying drawings, one conventional planar microlens array is used with a liquid crystal display panel composed of triads of pixels. The planar microlens array comprises circular microlenses 100 confronting the pixels, respectively. The pixels are spaced horizontally with a pitch a and vertically with a pitch b, the pitches a, b being different from each other. If the difference between the horizontal and vertical pitches a, b is larger, then those areas 101 of the pixels which are not covered by the respective microlenses 100 are larger. Therefore, the light applied to the liquid crystal display panel is not effectively utilized for producing a display pattern, and the image projected onto the screen is relatively dark.

The same problem arises if the horizontal and vertical pitches of pixels are different from each other in other pixel matrix configurations.

As shown in FIG. 5 (a) of the accompanying drawings, a pixel 1b of an active-matrix liquid crystal display panel has an asymmetrically shaped aperture 15 because of an area 16 in which there is located a switching element for applying a voltage to pixel electrodes, such as a TFT (thin-film transistor) or an MIM (metal-insulator-metal) diode.

The circular spot of light converged by each circular microlens 100 is positioned on a line M of the pixel aperture 15, as shown in FIG. 5 (b) of the accompanying drawings. Therefore, an area S of the aperture 15 is remote from the center of the light spot, and is not as effectively used as the other area of the aperture 15. Consequently, the image projected onto the screen is further made darker.

SUMMARY OF THE INVENTION

In view of the foregoing drawbacks of the conventional projection-type transmissive image display devices, it is an object of the present invention no provide a projection-type transmissive image display device capable of highly efficiently utilizing light emitted by a light source for producing light display images.

According to the present invention, there is provided an image display device comprising a light source for emitting light, a transmissive image display panel having a matrix of pixels arranged at different pinches in different direct ions perpendicular no each other, and a planar microlens array for converging the light emitted by said light source onto said transmissive image display panel, said planar microlens array comprising a substrate and a matrix of microlenses disposed on said substrate for converging the light onto the pixels, respectively, each said microlenses being of an oblong shape.

The oblong microlenses are shaped to fully cover the pixel apertures of the corresponding pixels, so that the light from the light source is efficiently converged onto the pixels by the microlenses to produce light display images.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a schematic side elevational view of an image display device according to the present invention;

FIG. 2 is a fragmentary perspective view of a planar microlens array used in the image display device shown in FIG. 1;

FIG. 3 is an enlarged fragmentary plan view of the planar microlens array shown in FIG. 2;

FIG. 4 (b) is a transverse cross-sectional view of the microlens, showing the manner in which incident light is converged by the microlens;

FIG. 4 (c) is a longitudinal cross-sectional view of the microlens, showing the manner in which incident light is converged by the microlens;

FIG. 4 (d) is a view showing a converged image on a focal plane of the microlens;

FIG. 5 (b) is a plan view of the pixel aperture;

FIG. 7 (b) is a fragmentary plan view of the planar microlens array shown in FIG. 7 (a) in combination with respective pixel apertures;

FIG. 7 (b) is a fragmentary plan view of the planar microlens array shown in FIG. 8 (a) in combination with respective pixel apertures;

FIG. 10 is a graph showing the relationship between the refractive index of an adhesive and the transmittance of an assembly of a microlens and a transparent substrate that are bonded by the adhesive.

DETAILED DESCRIPTION OF THE PREFERRED EMBODIMENTS

Figure 4A:
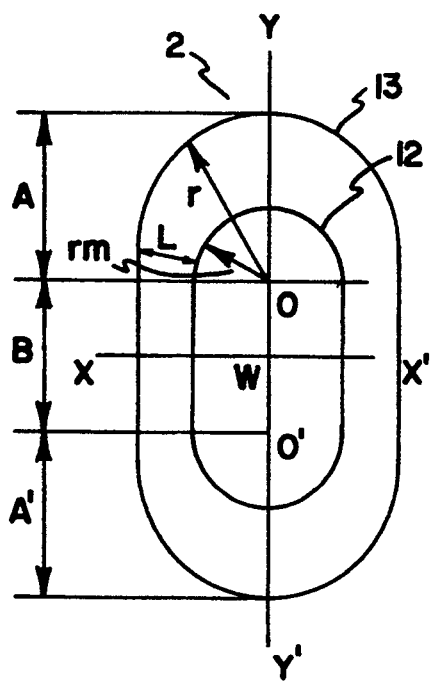
FIG. 4 (a) is a plan view of an oblong microlens of the planar microlens array.

As shown in FIG. 1, a projection-type transmissive image display device according to the present invention comprises a transmissive liquid crystal display panel 1, a planar microlens array 4 composed of a two-dimensional matrix of microlenses 2 disposed on a glass substrate 3, a condensing lens 5, a source 6 of white light, a reflecting mirror 7 for reflecting white light emitted by the source 6 toward the liquid crystal display panel 1, a projection screen 8, and a projection lens 9 for projecting the light that has passed through the liquid crystal display panel 1 onto the projection screen 8.

The liquid crystal display panel 1 comprises a pair of transparent substrates 1a with a two-dimensional matrix of pixels 1b disposed therebetween and supported thereon. The liquid crystal display panel 1 has an effective display area size of about 45.6 mm×62.0 mm, a vertical pixel pitch of 190 μm, a horizontal pixel pitch of 129 μm, and an aperture ratio (the proportion of the area of the apertures to the entire area of the pixels) of 41%. The transparent substrates 1a have a refractive index of 1.53, and each have a thickness of 0.7 mm.

The pixels 1b of the liquid crystal display panel 1 are arranged in triads each in the shape of an elongate triangle, but not a regular triangle. In view of such a pixel triad configuration, each of the microlenses 2 is of an oblong shape, as shown in FIGS. 2 and 3, to fully cover an area that includes the pixel aperture of the corresponding pixel 1b.

The microlenses 2 of the planar microlens array 4 are spaced at a vertical pixel pitch of 190 μm and a horizontal pixel pitch of 129 μm, which are the same as the vertical and horizontal pixel pitches of the liquid crystal display panel 1. Each of the microlenses 2 has a focal length of 0.7 mm which is equal to the thickness of each of the transparent substrates 1a. (In air, $0.7/1.53 \approx 0.46$ mm).

FIG. 4 (a) shows in plan each of the microlenses 2 as viewed in a direction normal LO the glass substrate 3. The microlens 2 is shown in a transverse cross section in FIG. 4 (b) along an axis X-X' in FIG. 4 (a), and in a longitudinal cross section in FIG. 4 (c) along an axis Y-Y' in FIG. 4 (a).

The microlenses 2 are fabricated according to the ion exchange process, as follows: First, the glass substrate 3 is coated with a metal diffusion mask of Al, Ti, Ni, or Cr which has minute holes or windows corresponding to the pixels of the liquid crystal panel 1. Then, the glass panel 3 is dipped, for a predetermined period of time, in a melted salt containing ions than contribute more to refractive indices than one-valence ions contained in the glass substrate 3. As a result, graded-index microlenses 2 whose refractive index is gradually lower radially outwardly from the center thereof are formed in the glass substrate 3, as shown in FIG. 2. In FIGS. 4 (b) and (c), points of equal refractive index in the microlens 2 are indicated by the reference numeral 11.

FIG. 4 (a) also illustrates each of the minute holes or windows, represented by the reference numeral 12, of the diffusion mask. The minute hole 12 is also of an oblong shape corresponding to the microlens 2. More specifically, the oblong shape of the minute hole 12 is composed of a pair of spaced identical semicircles interconnected by a rectangle whose sides are of the same length as the diameter of the semicircles. When the glass substrate 3 is dipped in the melted salt, its ions are isotropically diffused through the minute holes 12 of the diffusion mask so that a diffusion front (a foremost edge of the diffusing ions) 13 is represented by a curve that is equidistant from the oblong shape of the hole 12, i.e., spaced a diffusion length L from the oblong shape of the hole 12. Therefore, the diffusion front 13 is also of an oblong shape. The diffusion front 13 represents the outer boundary of the oblong microlens 2. The oblong microlens 2 has a longer axis extending along the longer pixel pitch of the liquid crystal display panel 1.

Figure 4C:
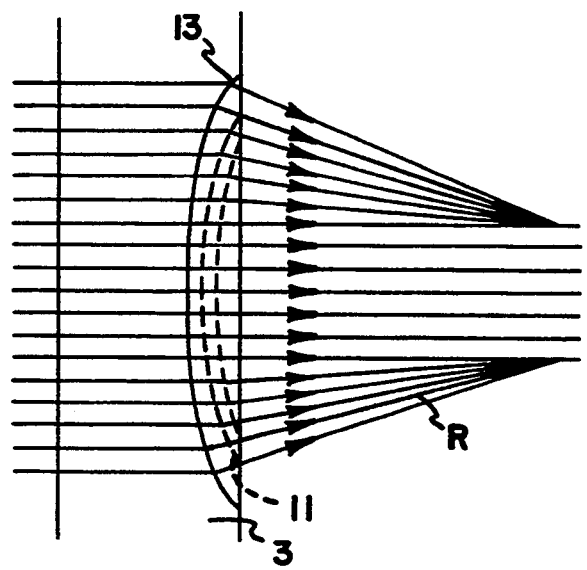
Figure 4B:
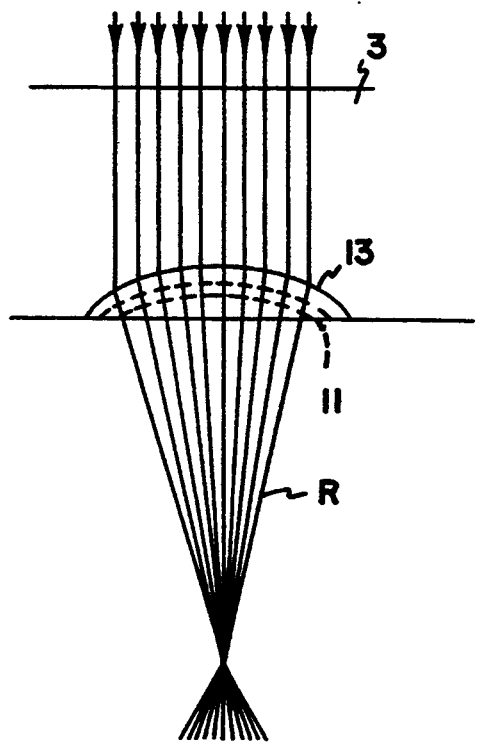

As shown in FIG. 4(a), each microlens 2 comprises a pair of spaced hemispherical lenses A, A' sandwiching a lenticular lens B which is capable of converging light only the transverse direction of the microlens 2. When light rays R (see FIG. 1) are incident on the microlens 2, the lens A converges the light rays R to the center O thereof, and the lens A' converges the light rays R to the center O' thereof, as viewed in a direction normal to the microlenses 2 in FIG. 4(a). Actually, the light rays R are converged onto a focal plane behind the microlenses 2 as shown in FIGS. 4(b) and 4(c).

Figure 4D:
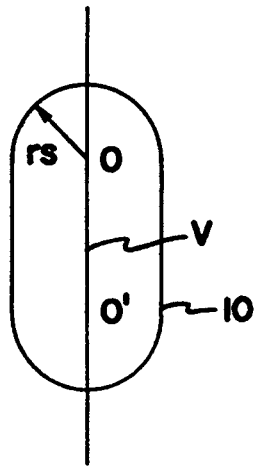

The lenticular lens B does not converge the light rays in the longitudinal direction (Y-Y') of the microlens 2, but converges the light rays in the transverse direction (X-X'). The light rays R converged by the microlens 2 form an oblong image 10 on the focal plane, as shown in FIG. 4(d), the centers O, O' being at the respective centers of opposite semicircles of the oblong image 10 as viewed in a direction normal to the image 10 in FIG. 4(d).

The image 10 which is converged onto the image plane by the microlens 2 is composed of a pair of spaced identical semicircles interconnected by a rectangle whose sides are of the same length as the diameter of the semicircles. The image 10 has a semicircle radius rs and a width which are determined by the angle in which the light emitted from the light source 6 (FIG. 1) spreads and the focal length of the microlens 2. When the angle in which the light emitted from the light source 6 spreads was 5° and the focal length of the microlens 2 was 0.46 mm, the radius rs of the semicircles of the image 10 was about 35 μm and the width of the image 10 was about 70 μm. The distance W (see FIG. 4 (a)) between the centers O, O' of the semicircles of the hole 12 is determined such that the oblong image 10 is positioned in the aperture of each pixel 1b of the liquid crystal display panel 1. If the radius rm of each semicircle of the hole 12 and the radius r of each semicircle of the diffusion front 13 are selected such than the ratio r/rm is in the range of from 1.8 to 3.0, then the microlens 2 has relatively small aberrations and can converge the light efficiently.

Figure 5A:
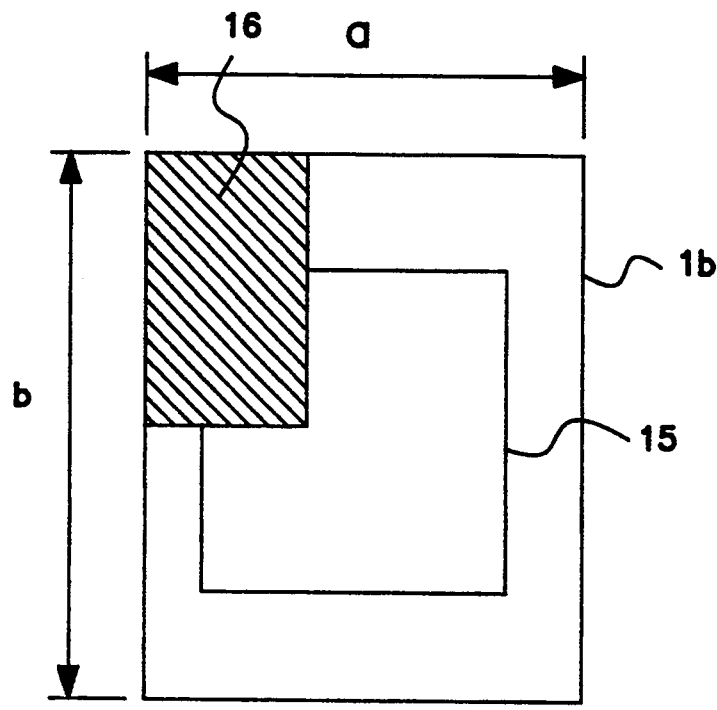
FIG. 5 (a) is a plan view of a pixel and a pixel aperture thereof.
Figure 5B:
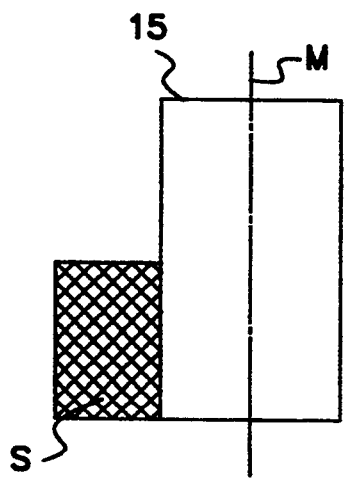

As described above, the pixel 1b which has a width a and a length b that are equal to the pixel pitches a, b, respectively, has an asymmetrical aperture 15, as shown in FIG. 5 (a), because of an area 16 in which there is located a switching element for applying a voltage to pixel electrodes, such as a TFT (thin-film transistor) or an MIM (metal-insulator-metal) diode, in an active-matrix liquid crystal display panel.

In the conventional image display devices, the circular spot of light converged by a circular microlens is positioned on a substantially central vertical line M of the pixel aperture 15, as shown in FIG. 5 (b).

Figure 6:
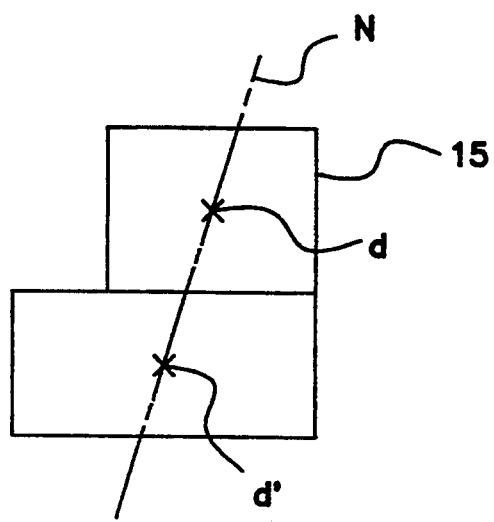
FIG. 6 is a plan view of the pixel aperture.
Figure 7A:
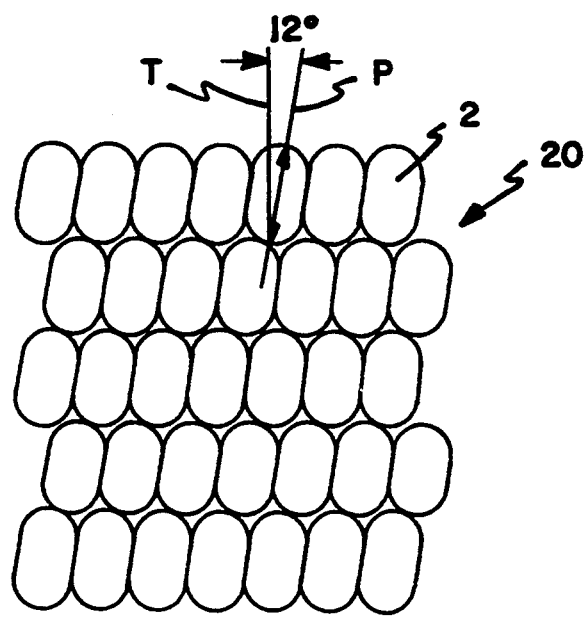
FIG. 7 (a) is a fragmentary plan view of a planar microlens array in an image display device according to another embodiment of the present invention.
Figure 7B:
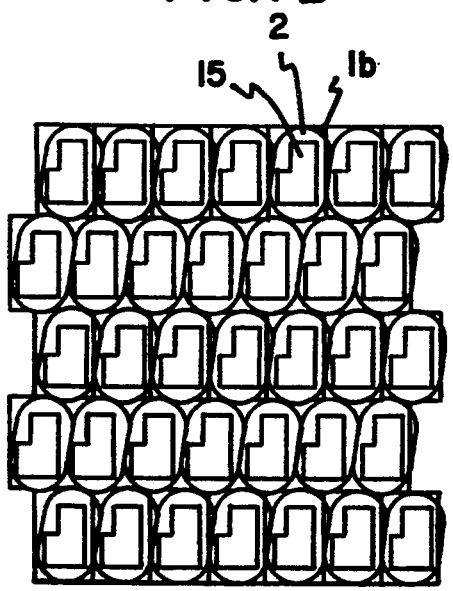

According no another embodiment of the present invention, in order to effectively utilize the entire area of the pixel aperture 15, the pixel aperture 15 is divided into two rectangles having respect ire centers d, d', as shown in FIG. 6, and a planar microlens array 20 as shown in FIG. 7(a) is arranged such that each oblong microlens 2 thereof has a major or longitudinal axis P inclined to a vertical axis T of the liquid crystal display panel 1 for aligning the vertical central axis V of the oblong image 10 (see FIG. 4 (d)) with a straight line N passing through the centers d, d '. In the embodiment shown in FIGS. 7 (a) and 7 (b), the longitudinal axis P is inclined to the vertical axis T by an angle of 12°. The microlenses 2 thus inclined and the corresponding pixels 1b of the liquid crystal display panel 1 are shown in FIG. 7(b). The pixel aperture 15 may be of another asymmetrical configuration, and each of the microlenses 2 may be inclined a suitable angle to cover the asymmetrical pixel aperture 15 as fully as possible.

As shown in FIG. 1, the microlenses 2 are aligned with the respective pixels 1b in a direction along the optical axis of the image display device. The planar microlens array 4 is bonded to the liquid crystal display panel 1 by an optical adhesive 25 therebetween which has a refractive index that is substantially equal to the refractive index of the transparent substrates ia of the liquid crystal display panel 1.

The transparent substrates 1a have a refractive index of 1.53 at their surfaces, and the microlenses 2 have a refractive index of about 1.6 at their surfaces. As shown in FIG. 10, if the refractive index of the optical adhesive 25 is in the range of from 1.4 to 1.7, then a reflection loss caused due to the difference between the refractive indices in the optical path from the microlens 2 to the transparent substrates 1a can be held in a range of 1%. The reflection loss is further minimized if the refractive index of the optical adhesive 25 is of an intermediate value between the refractive index (=1.53) of the surface of the transparent substrates 1a and the refractive index (=about 1.6) of the surface of the microlens 2.

The microlenses 2 are not of an elliptical shape. If each of the microlenses 2 were elliptical in shape, then it would have different focal lengths in its longitudinal and transverse directions due to astigmatism. When the corresponding pixel 1b would be positioned at the focal point associated with one of the focal lengths, then the pixel 1b would not be positioned at the focal point associated with the other focal length, with the result that the microlenses 2 would not effectively converge the applied light.

Figure 8A:
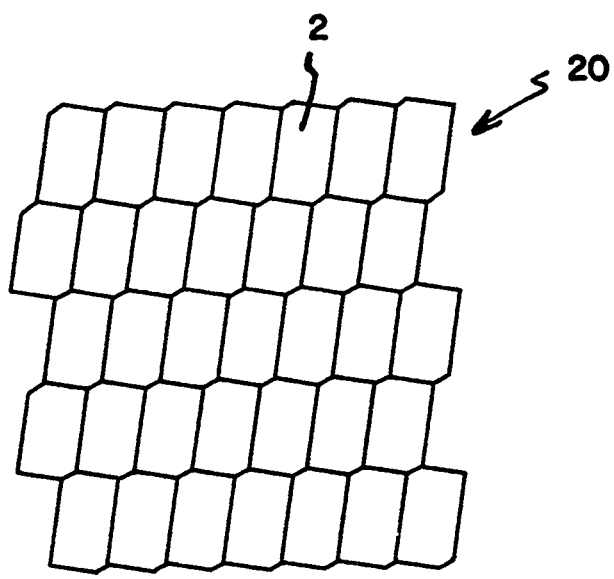
FIG. 8 (a) is a fragmentary plan view of a planar microlens array in an image display device according to still another embodiment of the present invention.

In the above embodiments, the microlenses 2 are fabricated such that adjacent microlenses 2 are held in contact with each other partially along their boundaries. However, insofar as aberrations of the microlenses are kept within an allowable range, the ions may be excessively diffused into the glass substrate 3 so that adjacent microlenses 2 are held in contact with each other fully along their boundaries, i.e., the glass substrate 3 is fully covered with the microlenses 2. According to still another embodiment shown in FIGS. 8 (a) and 8 (b), each microlens 2 is of a substantially rectangular or hexagonal oblong shape, and is inclined to cover the corresponding pixel aperture 15. Adjacent microlenses 2 have boundaries held in full contact with each other for converging almost 100% of the applied light.

The planar microlens array 4 or 20 may be fabricated of plastics according to the diffusion polymerization process.

The image display device has been shown as being incorporated in a Këhler illumination system, but may be combined with a critical illumination system or a telecentric illumination system.

The image display system may employ three liquid crystal panels for forming images of three primary colors, which may be combined into a fully colored image. Any other transmissive display panels than the liquid crystal display panel 1 may be used is the image display device according to the present invention. The principles to the present invention may be applied to a direct-viewing-type transmissive image display device.

Although there have been described what are at present considered to be the preferred embodiments of the invention, it will be understood than the invention may be embodied in other specific forms without departing from essential characteristics thereof. The present embodiments are therefore to be considered in all respects as illustrative, and not restrictive. The scope of the invention indicated by the appended claims rather than by the foregoing description.

What is claimed is:

1. An image display device comprising:
   a light source for emitting light;
   a transmissive image display panel having a matrix of pixels arranged at different pitches in different directions perpendicular to each other; and
   a planar microlens array for converging the light emitted by said light source onto said transmissive image display panel, said planar microlens array comprising a substrate and a matrix of microlenses disposed on said substrate for converging the light onto the pixels, respectively, each of said microlenses being of an oblong shape and including means for converging light to form a focus line such that an oblong image is formed on an image plane.

2. An image display device according to claim 1, wherein each of said pixels has an asymmetrical pixel aperture, each of said microlenses having a longitudinal axis inclined with respect Lo an axis of said matrix of pixels to cover the pixel aperture of one of said pixels.

3. An image display device according to claim 1, wherein said oblong shape of each of said microlenses is composed of a pair of spaced identical semicircles and a rectangle interconnecting said identical semicircles and having sides of the same length as the diameter of the semicircles.

4. An image display device according to claim 3, wherein each of said microlenses is fabricated as a diffusion front of ions diffused into said substrate of the planar microlens array through a hole defined in a diffusion mask, said hole in the diffusion mask being of an oblong shape including of a pair of spaced identical semicircles, each of the semicircles of said diffusion front having a radius r and each of said semicircles of said hole in the diffusion mask having a radius rm, the ratio r/rm is in the range of from 1.8 to 3.0.

5. An image display device according to claim 1, wherein said image display panel includes a transparent substrate on which said pixels are supported, said microlenses being arranged corresponding to said different pitches, respectively, in different directions perpendicular to each other, each of said microlenses having a focal length equal to the thickness of said substrate of the image display panel.

6. An image display device according to claim 5, wherein said microlenses are aligned with said pixels, respectively, said microlenses being bonded to said transparent substrate of the image display panel by an optical adhesive having a refractive index which is substantially the same as the refractive index of said transparent substrate.

7. An image display device according to claim 6, wherein said refractive index of said optical adhesive is of an intermediate value between the refractive index of a surface of said microlenses and the refractive index of a surface of said transparent substrate.

8. An image display device according to claim 1, wherein adjacent ones of said microlenses are held in contact with each other partially along boundaries thereof.

9. An image display device according to claim 1, wherein adjacent ones, in both of the horizontal and vertical directions, of said microlenses are held in contact with each other fully along boundaries thereof.

10. An image display device according to claim 9 wherein said microlenses have a substantially hexagonal oblong shape.

11. An image display device prepared by a method comprising the steps of:
arranging a substrate for a planar microlens array with respect to a diffusion mask;
diffusing a front of ions onto said planar microlens array through a hole in said diffusion mask, said hole being of an oblong shape including a pair of spaced identical first semicircles, said diffusion front having second semicircles, said second semicircles having a radius r and said first semicircles having a radius rm so that a ratio r/rm is between 1.8 and 3.0;
combining on opposite sides of said planar microlens array a light source for emitting light and a transmissive image display panel having a matrix of pixels arranged at different pitches in different directions perpendicular to each other, said planar microlens array converging the light emitted by said light source onto said transmissive image display panel.

12. An image display device comprising:
a light source for emitting light;
a transmissive image display panel having a matrix of pixels arranged at different pitches in different directions perpendicular to each other; and
a planar microlens array for converging the light emitted by said light source onto said transmissive image display panel, said planar microlens array comprising a substrate and a matrix of microlenses disposed on said substrate for converging the light onto the pixels, respectively, each of said microlenses being of an oblong shape so as to include a pair of spaced hemispherical lens portions and a lenticular lens sandwiched between said hemispherical lens portions.

* * * * *

UNITED STATES PATENT AND TRADEMARK OFFICE
CERTIFICATE OF CORRECTION

PATENT NO. : 5,337,186

DATED : August 9, 1994

INVENTOR(S) : Oikawa et al

It is certified that error appears in the above-indentified patent and that said Letters Patent is hereby corrected as shown below:

Column 1, line 30, "Goes" should read --does--.

Column 1, line 34, "Confronting" should read --confronting--.

Column 2, lines 7 and 15 and Column 5, line 3, "no" should read --to--.

Column 2, line 14, "pinches" should read --pitches--.

Column 2, line 15, "direct ions" should read --directions--.

Column 2, line 21, after the word "each" insert --of--.

Figure 8B:
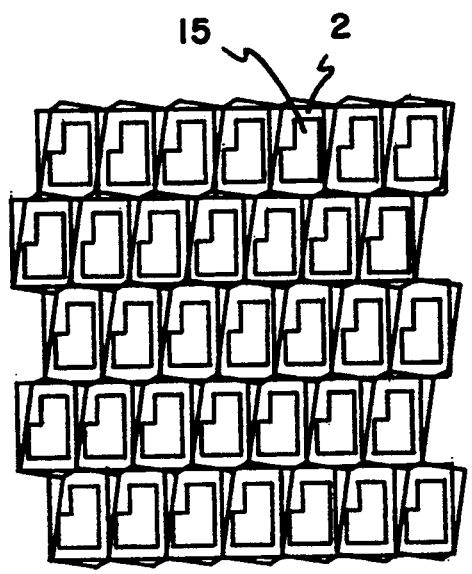
Figure 9:
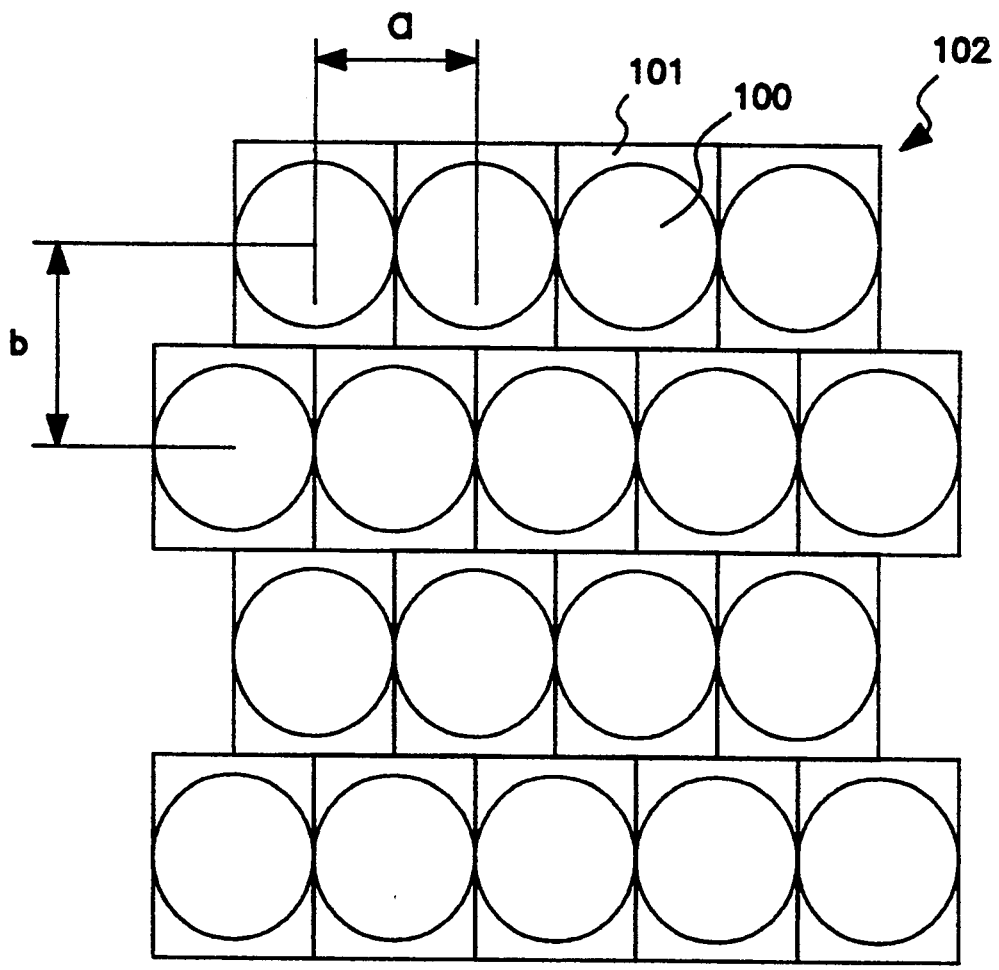
FIG. 9 is a plan view of a conventional planar microlens array.

Column 2, line 66, "Fig. 7(b)" should read --Fig. 8(b)--.

Column 3, line 47, "LO" should read --to--.

Column 3, line 64, "and (c)" should read --and 4(c)--.

Column 4, line 20, after the word "only" insert --in--.

Column 4, line 44, "and" should read --on--.

UNITED STATES PATENT AND TRADEMARK OFFICE
CERTIFICATE OF CORRECTION

PATENT NO. : 5,337,186
DATED : August 9, 1994
INVENTOR(S) : Oikawa et al

It is certified that error appears in the above-indentified patent and that said Letters Patent is hereby corrected as shown below:

Column 5, line 28, "ia" should read --1a--.

Column 6, line 5, "Kēhler" should read --Köhler--.

Column 6, line 45, "Lo" should read --to--.

Signed and Sealed this

Seventh Day of November, 1995

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,337,186
DATED : August 9, 1994
INVENTOR(S) : Oikawa et al

It is certified that error appears in the above-indentified patent and that said Letters Patent is hereby corrected as shown below:

On the title page: Item [73] Assignees:, "Inc." should read --Co., Ltd. --.

Signed and Sealed this

Fifth Day of March, 1996

Attest:

BRUCE LEHMAN

*Attesting Officer*     *Commissioner of Patents and Trademarks*